(12) United States Patent
Dannecker et al.

(10) Patent No.: US 10,095,757 B2
(45) Date of Patent: Oct. 9, 2018

(54) MULTI-REPRESENTATION STORAGE OF TIME SERIES DATA

(71) Applicant: SAP SE, Walldorf (DE)

(72) Inventors: Lars Dannecker, Dresden (DE); Gordon Gaumnitz, Wiesloch (DE); Boyi Ni, Shanghai (CN); Yu Cheng, Shanghai (CN)

(73) Assignee: SAP SE, Walldorf (DE)

( * ) Notice: Subject to any disclaimer, the term of this patent is extended or adjusted under 35 U.S.C. 154(b) by 274 days.

(21) Appl. No.: 14/961,502

(22) Filed: Dec. 7, 2015

(65) Prior Publication Data

US 2017/0161340 A1    Jun. 8, 2017

(51) Int. Cl.
| | |
|---|---|
| G06F 17/00 | (2006.01) |
| G06F 17/30 | (2006.01) |
| G06F 3/06 | (2006.01) |

(52) U.S. Cl.
CPC ........ *G06F 17/30554* (2013.01); *G06F 3/061* (2013.01); *G06F 3/0661* (2013.01); *G06F 3/0673* (2013.01); *G06F 17/30342* (2013.01)

(58) Field of Classification Search
CPC ............................................... G06F 17/30342
See application file for complete search history.

(56) References Cited

U.S. PATENT DOCUMENTS

| | | | | |
|---|---|---|---|---|
| 2015/0347568 | A1* | 12/2015 | Chen .................. | G06F 17/30554 707/722 |
| 2016/0366547 | A1* | 12/2016 | Hodges ................... | H04W 4/02 |

FOREIGN PATENT DOCUMENTS

WO     2014149027 A1    9/2014

OTHER PUBLICATIONS

Nguyen Quoc Viet Hung, Hoyoung Jeung, and Karl Aberer (2013), "An Evaluation of Model Based Approaches to Sensor Data Compression", IEEE Transactions on Knowledge and Data Engineering, 25 (2011), pp. 1-14.*
Extended European Search Report dated May 18, 2017 for EP Appln. 16002566.4; 8 pages.
Nguyen Quoc Viet Hung, H.J. (2013). An Evaluation of Model Based Approaches to Sensor Data Compression. IEEE Transactions on Knowledge and Data Engineering, 25 (2011), 2434-2447.

* cited by examiner

*Primary Examiner* — Cheryl Lewis
(74) *Attorney, Agent, or Firm* — Fountainhead Law Group P.C.

(57) ABSTRACT

A flexible approach for storing time series data, utilizes multiple representations in order to achieve optimization amongst various dimensions such as covered time period, accuracy, compression model, and storage medium. A first aspect selectively provides different representations for various portions of a time series along the time axis (horizontal). In this horizontal aspect, a first compression model may be applied to store data occurring during one period in a time series, while a different compression model is applied to store data during another period. In a separate (vertical) aspect, time series data over a same time period may be saved in multiple representations using different compression models. While increasing demands on memory, such vertical storage can afford efficient access for specific purposes (i.e., analytical). Storing time series data according to horizontal and/or vertical distributions, may be useful for applications such as data aging and the optimization of operator execution patterns.

20 Claims, 11 Drawing Sheets

MULTI-REPRESENTATION STORAGE OF TIME SERIES DATA

BACKGROUND

Unless otherwise indicated herein, the approaches described in this section are not prior art to the claims in this application and are not admitted to be prior art by inclusion in this section.

Embodiments relate to time-series data, and in particular, to a multiple-representation approach for storing time series data. Time series are sequences of recorded data points ordered along the time dimension, that often arise when monitoring industrial processes, business characteristics and Key Performance Indicator (KPI) developments, financial parameters, scientific experiments, physical measurements, and others.

Time series analysis are data analysis techniques used as a basis for business planning and decision support in many application domains. There thus exists an ever-present interest in research and industry, to query, mine, and analyze time series. A task of time series analysis is to identify patterns, sequences, correlations, and characteristics within and between time series data, and to draw conclusions based on those observations.

Recent developments in computer hardware and sensor technology have resulted in increasing availability of continuous measurements recorded with sampling rates of up to MHz or higher. This leads to fine grained time series, and hence to a substantially increasing data volume and data streaming frequencies.

In addition, the amount of available sensors is growing substantially, especially given new application scenarios such as the Internet of Things (IoT). As an example, location based services on mobile phones offer potentially millions of sensors providing data at the same time.

SUMMARY

A flexible approach for storing time series data, utilizes multiple representations in order to achieve optimization amongst various dimensions such as memory consumption, accuracy, and persistence. As used herein, a time series representation refers to a storage scheme of time series data, i.e., how the data points of a time series column are stored in memory. A representation defines the following four parameters: covered time period, model-based compression technique, accuracy (e.g., error bound specification), and a storage medium.

A first aspect of multi-representation time series storage selectively provides different representations for various portions of a time series along the time axis (horizontal). In this horizontal aspect, a first compression model, accuracy, and/or storage medium may store data occurring during one period in a time series, while a different compression model, accuracy, and/or storage medium is applied to store data during another period.

According to a separate (vertical) aspect, time series data over a same period may be saved in multiple representations using different compression models, error bounds, and/or storage media. While increasing demands on memory, such vertical storage can afford efficient access for specific purposes (i.e., analytical). Storing time series data according to horizontal and/or vertical distributions, may be useful for applications such as data aging and the optimization of operator execution patterns resulting in a reduced query response time and/or an improved algorithm performance provided by the system.

An embodiment of a computer-implemented method comprises an engine receiving time series data. The engine references a first input to create from the time series data, a first representation comprising a covered time period, a compression model, an error bound, and a storage medium, wherein the configuration designates the first representation as lying within a hot zone. The engine stores the first representation within the storage medium. The engine references a second input to create from the time series data, a second representation differing from the first representation in at least one of the covered time period, the compression model, the error bound, and the storage medium. The engine stores the second representation.

A non-transitory computer readable storage medium embodies a computer program for performing a method comprising an engine receiving time series data, and the engine referencing a first input to create from the time series data, a first representation comprising a covered time period, a compression model, an error bound, and the non-transitory computer-readable storage medium, wherein the configuration designates the first representation as lying within a hot zone. The engine stores the first representation in the non-transitory computer readable storage medium. The engine references a horizontal configuration to create from the time series data, a second representation differing from the first representation in at least one of the compression model, the error bound, and the non-transitory computer readable storage medium, a second covered time period of the second representation not overlapping the covered time period of the first representation. The engine stores the second representation.

An embodiment of a computer system comprises an in-memory database engine and a software program executable on said computer system and configured to cause the in-memory database engine to receive time series data. The software program is further configurable to cause the in-memory database engine to reference a first input to create from the time series data, a first representation comprising a covered time period, a compression model, an error bound, and a storage medium, wherein the configuration designates the first representation as lying within a hot zone. The software program is further configured to cause the in-memory database engine to store the first representation in the storage medium. The software program is further configured to cause the in-memory database to reference a second input to create from the time series data, a second representation differing from the first representation in at least one of the covered time period, the compression model, the error bound, and the storage medium. The software program is further configured to cause the in-memory database to store the second representation.

In certain embodiments the second input comprises a horizontal configuration, and a second covered time period of the second representation does not overlap the covered time period of the first representation.

In some embodiments the engine references a vertical configuration to create from the time series data, a third representation, wherein a third time period of the third representation overlaps the covered time period of the first representation or the second covered time period of the second representation, and wherein the third representation differs from the first representation in at least one of the compression model and the error bound.

In various embodiments the second input comprises a vertical configuration; and a second time period of the second representation overlaps the covered time period of the first representation.

According to particular embodiments the second input is based upon a data aging process.

According to certain embodiments the second input is based upon an operation execution pattern optimization process.

In particular embodiments the storage medium comprises a Random Access Memory (RAM) of an in-memory database, and the engine comprises an in-memory database engine.

In some embodiments data of the first representation or of the second representation are stored with a granularity determined by the compression model, and the method further comprises the engine receiving a request to return the data of the first representation or of the second representation according to a different granularity, and an iterator executing an algorithm to return the data of the different granularity to the engine.

In certain embodiments the iterator executes the algorithm to perform aggregation or disaggregation.

The following detailed description and accompanying drawings provide a better understanding of the nature and advantages of embodiments.

DETAILED DESCRIPTION

Described herein are methods and apparatuses configured to provide multi-representational storage of time series data. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

A flexible approach for storing time series data, utilizes multiple representations in order to achieve optimization amongst various dimensions such as covered time period, compression technique, accuracy, persistence (storage medium), and memory consumption. A first aspect selectively provides different representations for various portions of a time series along the time axis (horizontal). In this horizontal aspect, a first compression model, accuracy, and/or storage medium may store data occurring during one period in a time series, while a different compression model, accuracy, and/or storage medium stores data during another period. According to a separate (vertical) aspect, time series data over a same period may be saved in multiple representations using different compression models. While increasing demands on memory, such as vertical storage can afford efficient access for specific purposes.

Storing time series data according to horizontal and/or vertical distributions, may be useful for applications such as data aging and the optimization of operator execution patterns. Multi-representation according to embodiments may thus combine benefits of different representations in order to achieve rapid execution together with lower memory consumption, requirements that may conflict in conventional approaches.

Figure 1:
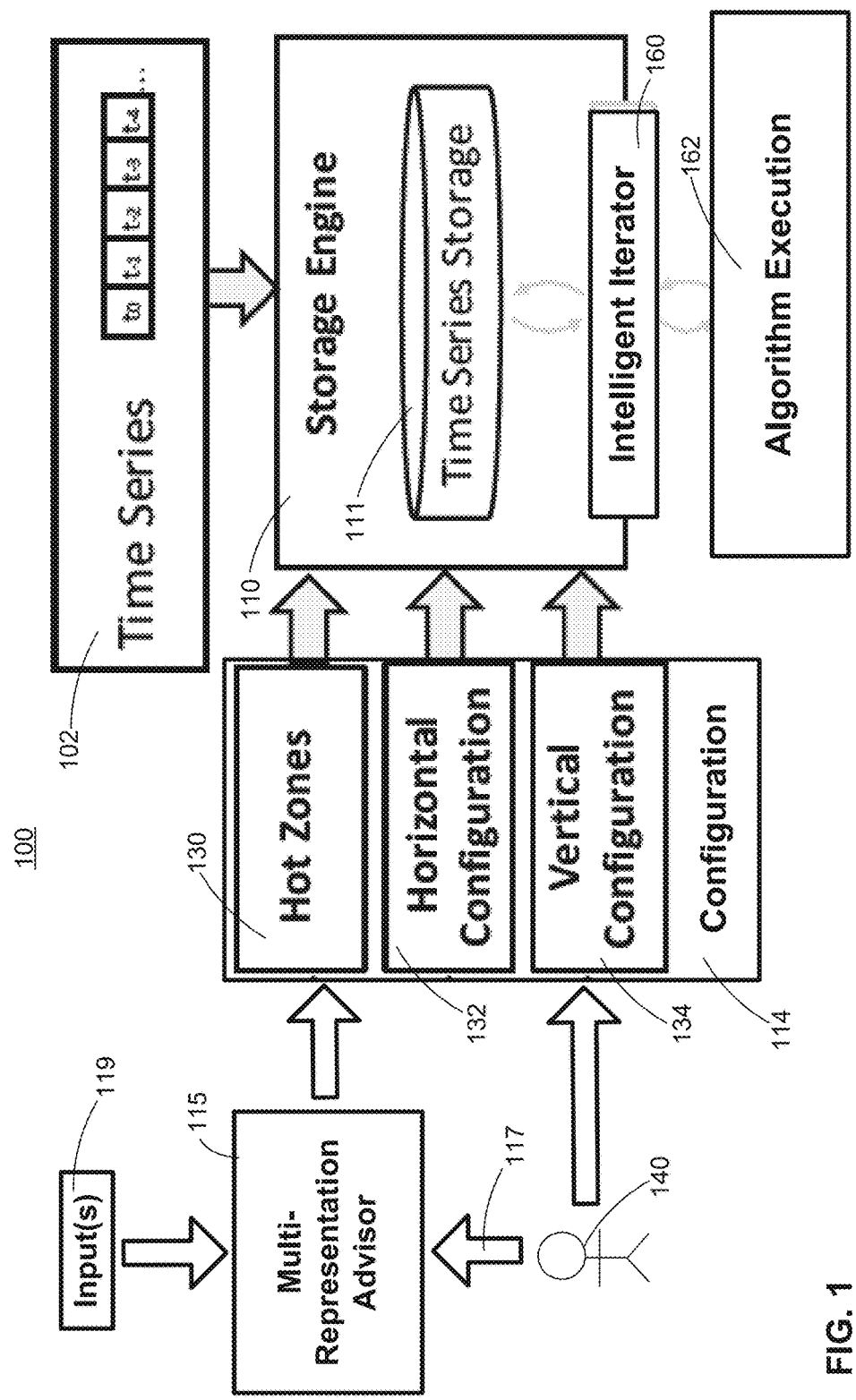
FIG. 1 is a simplified view of a system according to an embodiment.

FIG. 1 presents a simplified view of a system 100 according to an embodiment. In particular, an input in the form of time series data 102 is taken from a most recent time $t_0$ through times of $t_{-4}$ and earlier.

A time series comprises one column representing time, and a corresponding column with a number of (e.g., $N$) values representing different measurements. A time series might also comply with multiple columns. Each column may comply with a different data type.

Given such a multi-column (i.e., multi-variate) time series, all columns comply to the single time stamp and in addition it is ensured that all of them have the same length. Embodiments of multi-representation storage are typically applied per column, and there might be different horizontal and vertical configurations for each column.

Specifically, a storage engine 110 receives the time series data. The storage engine also receives as a configuration input 114 that may specify a hot zone designation 130, a horizontal configuration 132, and/or a vertical configuration 134. These inputs are discussed below in connection with FIG. 1A.

Based upon the inputs, the storage engine generates from the time series data, a time series storage 111 comprising multiple representations thereof. Those multiple representations may be distributed on a horizontal (time) axis and/or a vertical (representation) axis.

Figure 1A:
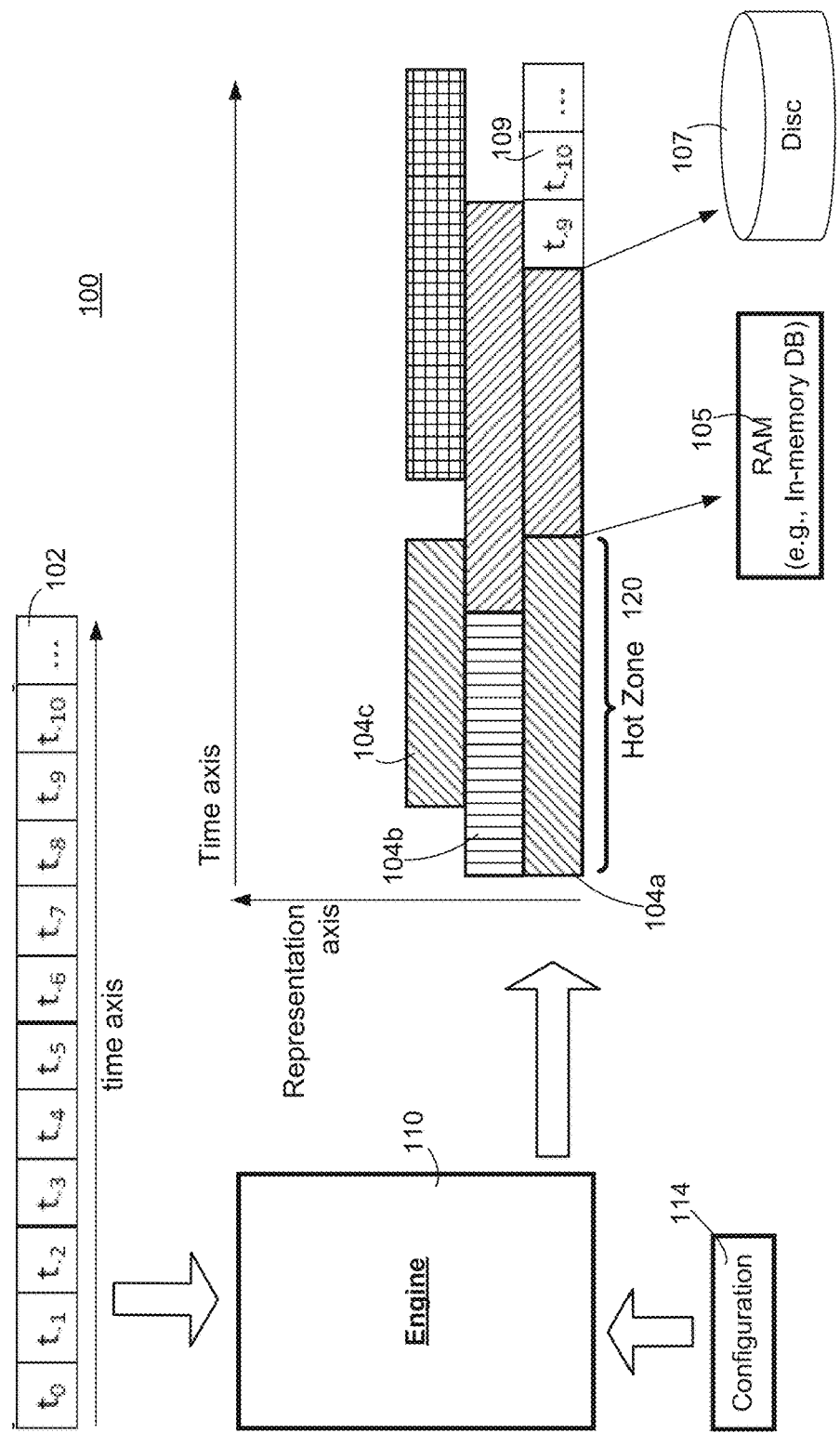
FIG. 1A is a detailed view of the system of FIG. 1.

In particular, FIG. 1A shows a detailed view of the system of FIG. 1. FIG. 1A shows the time series data stored utilizing multiple representations (e.g., 104a, 104b, 104c) distributed on the horizontal (time) axis and/or the vertical (representation) axis. Time series representations are storage schemes of time series data, i.e., how the data points of a time series column are stored. Representations of a time series column may correspond to one or more of the following aspects:

1) time period covered;
2) compression technique (e.g., model-based compression);
3) acceptable error bounds (i.e., deviations between compressed and real value within a particular compression model—usually expressed as a percentage);
4) storage media (main memory 105, flash, disc 107, tape, etc.)

Thus a time series column might be stored in a first representation (e.g., using a model-based compression) with an error bound of 1% in main memory. Or, the time series column may be stored in a different representation without any compression (e.g., raw values 109 on a less expensive hard disc or tape medium).

Depending on the specific configuration, each representation provides different characteristics with respect to factors such as covered time period, compression ratio, memory consumption, error bound, and execution efficiency. For this reason, rather than providing only a single representation for the entire time series, embodiments allow storing multiple representations over a same time period (vertical multi-representation) and/or for different time periods (horizontal multi-representation).

FIG. 1A further shows the storage engine also receiving the configuration input 114. This can comprise the hot zone designation, horizontal configuration, and/or vertical configuration.

Returning to FIG. 1, in certain embodiments the hot zone designation, horizontal configuration, and/or vertical configuration may be provided to the engine by a human user 140. In such an embodiment, the user seeks to manually direct the generation and storage of multiple representations of time series data.

Alternatively, however, the hot zone designation, horizontal configuration, and/or vertical configuration inputs to the storage engine, may be generated by a separate multi-representation advisor component 115. Details regarding the multi-representation advisor are provided in connection with FIG. 8.

In particular, the advisor may reference a cost model 112 including values quantifying the various dimensions (e.g., compression technique, accuracy, covered time period, memory consumption, speed) of the multi-representations.

Figure 8:
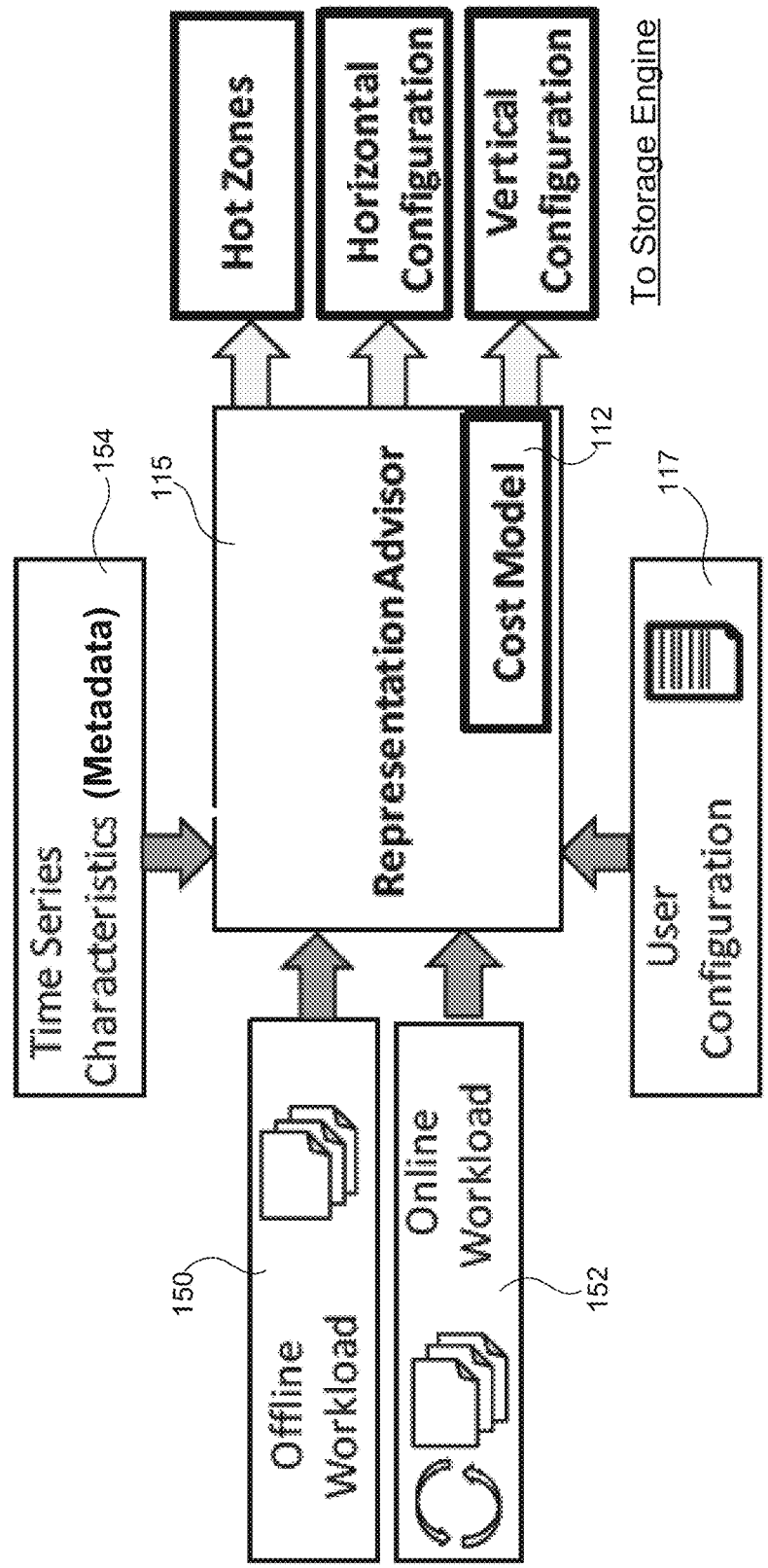
FIG. 8 presents a simplified view of an advisor component, including inputs and outputs.

FIG. 1 also indicates that the advisor may also receive a user configuration 117, as well as additional inputs 119. As shown in FIG. 8, those additional inputs can comprise previous (off-line) storage workload activities 150, current (on-line) storage workload activities 152, and time series characteristics 154.

Here, the offline advisor mode creates the initial configuration when a time series is added, based upon a previous workload. In an online mode, the advisor is also capable of adapting the configuration with respect to ongoing changes in the querying behavior or time series characteristics in a current workload. The offline and online workloads are discussed in detail later below.

Regarding the time series characteristics, these represent metadata of the time series data. Such characteristics can include but are not limited to, length, interval, minimums, maximums, numbers of distinct values, mean, standard deviation, variance, data types, etc. The time series characteristics are also discussed further below.

Returning now to FIG. 1A, based upon one or more inputs received (from the user and/or advisor), the engine may further function to identify "Hot Zones" 120 that are present within the time series data. A hot zone is the range in the time series that is frequently targeted by queries and operations. In some cases, this involves the most recent values of the time series, since they may be of special interest for analysis algorithms and aggregations. However, this is not required, and hot zones may reside at other than a most recent time (e.g., from a vibration sensor indicating an earthquake event in the past). Details of configuring hot zone(s) in stored multi-representation time series data, are provided later below.

As previously mentioned, high data rates and huge data volumes are driving increased memory pressure and analysis execution efficiency issues on modern in-memory database systems responsible for storage and analysis of time series data. Application of lossy and lossless compression techniques may address the issue from the perspective of memory consumption.

However, the various compression techniques have different characteristics with respect to compression ratio and execution speed of algorithms. Some approaches provide a very high compression ratio, but are slow for querying and mining. Others can provide very fast results for certain analysis requests, while suffering in execution time for other analysis or in terms of compression ratio.

Thus, selecting a most beneficial data representation for certain periods within the time series may be important for optimizing dimensions of execution efficiency, memory consumption, and accuracy. Thus according to embodiments, this selection can be performed with respect to the respective query workload, and in particular considering factors including but not limited to:
most often used algorithms and aggregations,
most recently and/or most often requested time series,
target requested time frames of a time series;
user preferences defined by user configuration, including definition of an error threshold with respect to the accuracy.

Various compression techniques are now described. Compression techniques are typically distinguished as lossy and lossless. Lossless compression techniques, e.g., Run Length Encoding (RLE), delta encoding, or bit compression) exploit similarities, reoccurrences, patterns or special alignments in the data to reduce the required memory. They are specifically suited for datasets with a low number of distinct values and reoccurring patterns.

While the following description focuses upon lossy compression techniques, this is not required. In some embodiments multi-representation of time series data could be based upon lossless compression.

Embodiments as described below explicitly focus on lossy compression, and use model-based compression as an example. Model-based compression seeks to approximate the values of a time series by fitting a model that best approximates the time series at hand.

Many compression techniques allow a definition of a per-value or per-time series error bound. With that, they limit the information loss (i.e., the error that occurs when using lossy compression techniques).

The following describes several exemplary model-based compression techniques that can be employed. These represent only examples, however, and other compression techniques can be added in a generic way according to various embodiments.

One lossy compression technique is Adaptive Piecewise Constant Approximation (APCA). This compression technique partitions the time series into segments, where each segment approximates the contained variables by a constant function. The segment is created by determining a segment value and adding observations to this segment as long as the value complies with the defined error bound around the approximation constant. The error type is per value.

Another lossy compression technique is Swinging Door Trending (SDT). SDT is similar to APCA. It divides the time series into segments, within which the values are approximated by a linear function. Values are added to the segment as long as the linear borders (the doors) jointly describe an angle of 180° towards their orthogonal connection at the first point. The error type is per value.

Still another lossy compression technique is Spline Approximation (SA). SA fits a spline to the time series. Values are added to the current spline as long as it ensures a defined error bound. Otherwise, a new spline segment is created. The error type is per value or per series.

Another lossy compression technique is Full Model Description (FMD). Here, a time series model (e.g., Holt Winters) is fitted to the entire time series. The model is then used to calculate a value for each point in time. The error type is per value or per series.

For compression techniques defining a per value error, the overall error over the entire time series may typically be much smaller. The reason is that the models used in model-based compression typically describe an average case of the time series values. Thus, the real values deviate positively and negatively from the approximation.

In addition, the per-value error bound only refers to the maximum of the error, rather than the actual error. As a result, the error effect evens out over time.

Figure 2:
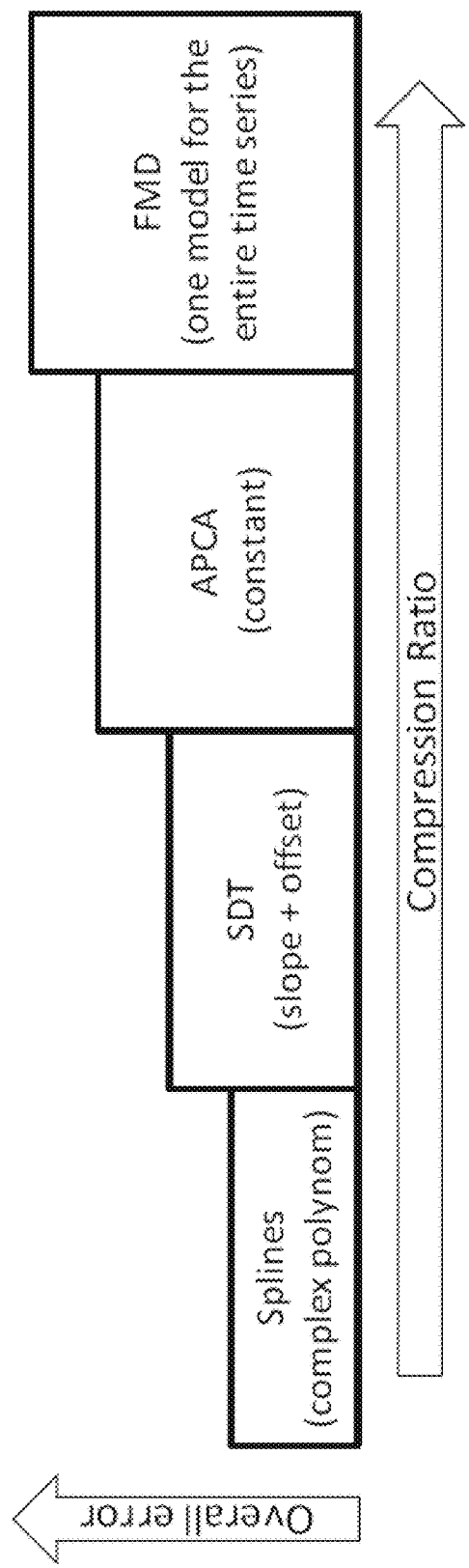
FIG. 2 shows exemplary compression techniques which may be utilized to perform multi-representation of time series data according to embodiments.

FIG. 2 provides an assessment of certain compression techniques with respect to memory consumption and potential time series error. It is noted that this figure abstracts from other facets of a time-series data representation (namely the provided error bound as well as the storage medium.) Also, this figure presents only a small number of the possible compression techniques that are available for use in multi-representation according to embodiments, and a variety of other compression techniques may be used.

FIG. 2 includes the particular example techniques specifically referenced in the instant description. Those selected techniques might be replaced other kinds of lossy compression techniques. Whatever the compression technique, it may be judged with respect to one or more of the following relevant dimensions:
reachable compression ratio;
deviation from real values (i.e., approximation error);
compression/decompression speed;
execution speed of aggregation and analysis algorithms.

Apart from reduction of the used memory space, model-based compression techniques may also provide certain other benefits. First, they offer the potential to reduce the execution speed of standard aggregation operations. These include but are not limited to SUM, AVG, HISTOGRAM, STDDEV.

Thus for calculating the standard aggregation SUM given an APCA compression, running over segments is less expensive than scanning the entire time series column. However, the potential of a model-based compression technique to improve calculation speed depends upon the particular function. As described below in connection with the examples of FIGS. 5-7, this potential for optimizing execution patterns may offer further motivation for the multi-representation approach described herein.

A second potential benefit of model-based compression techniques is that interpolation and granularization are achieved for free. That is, the continuity feature of model-based compression techniques (i.e., use of continuous functions instead of discrete values) allows abstracting from available values and the granularity of the time stamps. Missing values are determined by evaluating the continuous function of the model.

Similarly, the time stamp resolution can be increased and decreased by sampling the values from the underlying compression model.

Furthermore, the continuity feature of the function also allows for a non-equidistant sampling. This results in the compression providing an easy way of storing non-equidistant time series from a value point of view.

A third potential benefit of model-based compression techniques is that some analysis functions are easier to compute. Two prominent examples are outlier detection, as well as predictions.

Specifically, since model-based compression techniques typically create models to describe the general case of the time series, strong outliers can easily be detected as divergent from the general model. Similarly, for forecasting, since a model already exists, the prediction is a simple calculation by projecting the model into the future. Again however, specific properties of these analysis functions differ between various available model-based compression techniques.

As mentioned extensively above, embodiments employ multi-representation storage of time series data. Thus instead of allowing only a single data representation per time series column, embodiments support multiple representations in a horizontal and/or vertical fashion. This approach seeks to further optimize efficiency in the various performance dimensions of memory consumption, accuracy, and execution speed.

Figure 3:
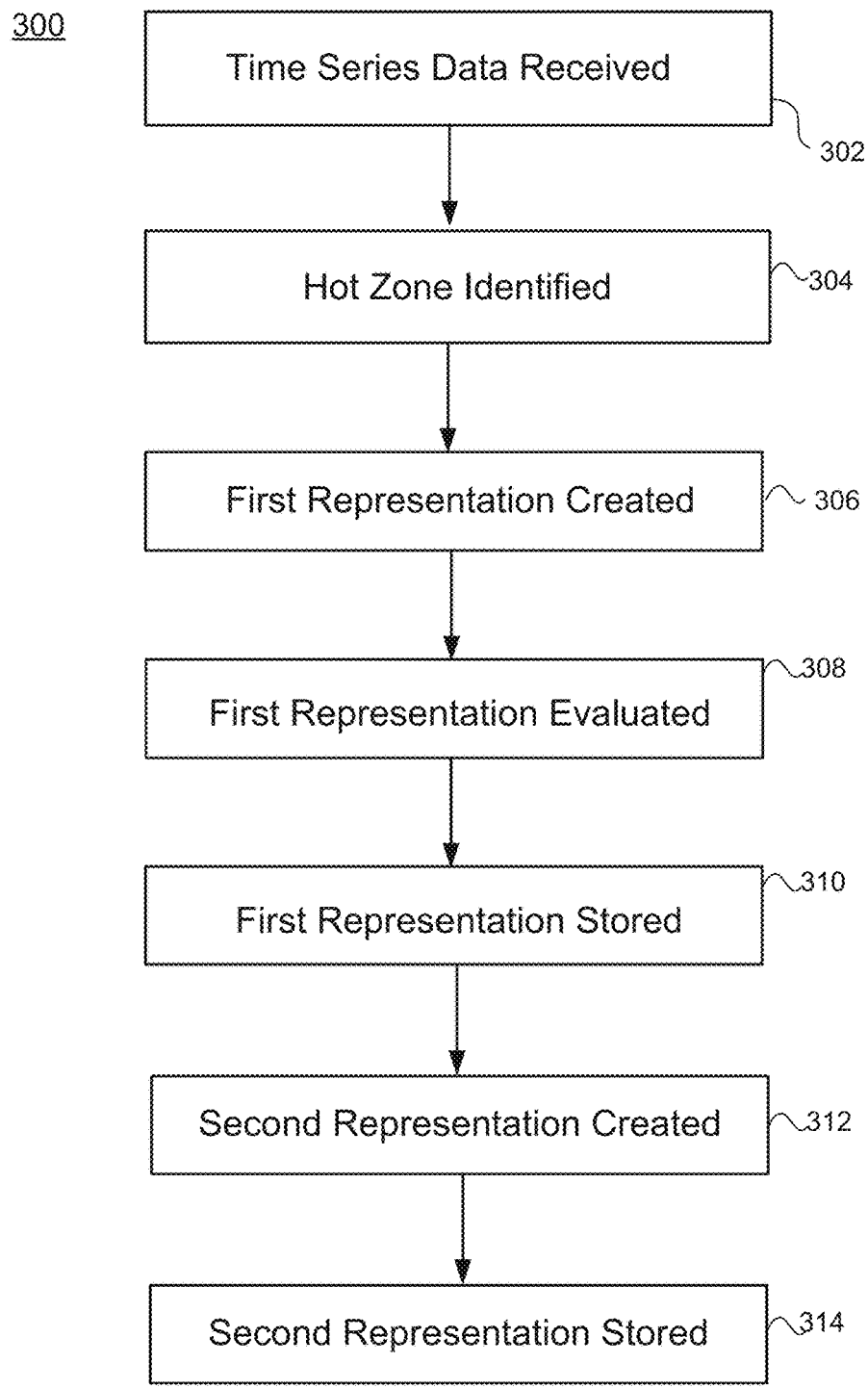
FIG. 3 shows a simplified flow diagram of a method according to an embodiment.

FIG. 3 is a simplified flow diagram showing a method 300 according to an embodiment. In a first step 302, time series data is received.

In a second step 304, a hot zone within the time series data is identified. In a third step 306, a first representation of data in the hot zone is created.

In a fourth step 308, the first representation is evaluated. In a fifth step 310, the first representation is stored.

In a sixth step 31, a second representation of the time series data is created. In a seventh step 314, the second representation is stored.

As mentioned above, multi-representation time series storage according to embodiments may employ both horizontal and vertical distribution aspects. Providing multiple representations in a horizontal manner refers to different periods of the time series column, using different data representations. One use case for this horizontal multi-representation is data aging.

Example—Data Aging

Data aging refers to the process of moving certain data to different storage media, depending upon aspects such as frequency of access and cost. Data aging may store the most recent part of the time series as accurately as possible, with a representation providing a good execution speed for time series analysis.

In contrast, for older values the acceptable error rate may be progressively increased and also allows for reduced execution speed. The rationale behind this storage scheme is that more recent values are requested more often, and are more frequently the target of time series analysis algorithms as compared to older values.

In addition, so-called hot zones (i.e., areas in the data that are frequently the target of analysis/aggregation operations), may be identified. Hot zones are often (but not necessarily) part of the most recent values.

Thus, data aging and hot zones provide a way to progressively decrease the memory consumption over time. This would not be possible when only using a single data representation for the entire column.

Figure 4:
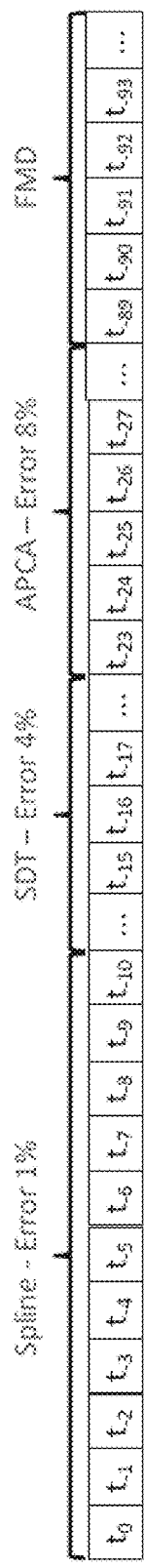
FIG. 4 illustrates implementing a data aging process utilizing horizontal multi-representation storage of time series data according to an embodiment.

FIG. 4 illustrates data aging utilizing horizontal multi-representation. This example changes the model-based compression technique and error rate, leading to reduced memory consumption at the expense of potentially reducing the accuracy of the approximation.

In the example of FIG. 4 a hot zone coincides with the most recent values, and contains the first eleven values. This particular example uses a spline compression with an error of 1% per value for the hot zone, selecting different compression techniques with relaxed error bounds for data outside of the hot zone.

Example—Execution Pattern Optimization

Besides data aging, it is also possible to analyze the access pattern of aggregation or analysis queries and assign data representations beneficial for the respective function at hand. Such an application could focus upon execution speed, rather than optimizing the memory consumption. This approach is referred to as execution pattern optimization.

Figure 5:
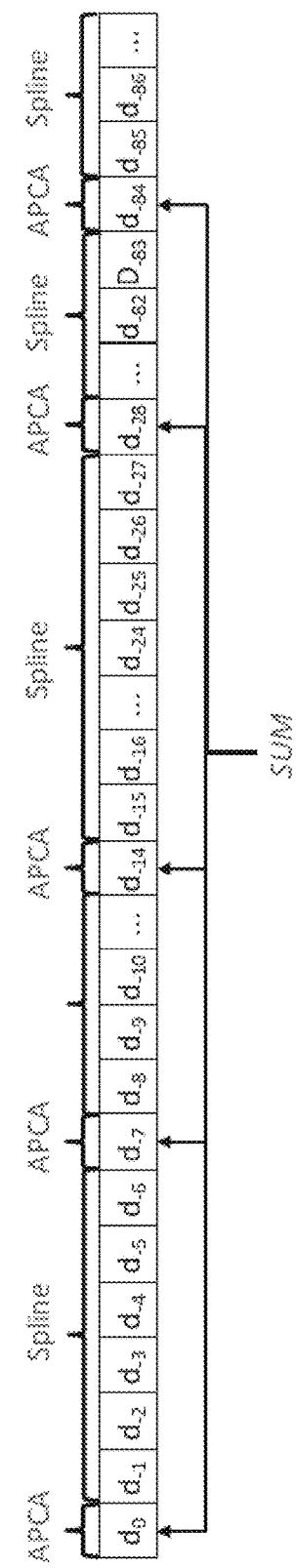
FIG. 5 illustrates implementing an execution pattern optimization process utilizing horizontal multi-representational storage of time series data according to an embodiment.

Consider an example in FIG. 5, showing time series data with daily ($d_n$) granularity. In this example, APCA 1% is most beneficial when calculating the SUM aggregation, and SUM is the most frequent operation in the workload. Given that only the first day of a week is considered for the aggregation, one would identify the hot zones in the data accordingly and choose APCA 1% for every first day of a week (e.g., $d_0$, $d_{-7}$, $d_{-14}$, etc.)

For the other data points (corresponding to later days of the week), one would choose another representation with a better compression ratio.

Vertical multi-representation can improve upon the storage strategy utilizing horizontal multi-representation, by supporting multiple representations at the same time within hot zones. Thus multiple operations can have joint target areas within the same period of the time series.

In addition, combining with horizontal distribution of data representations, it is also possible to apply multiple data representations vertically. With the help of this approach, it is possible to further improve the execution speed of time series aggregation and analysis operations.

For this purpose, multiple data representations are provided at the same time, given that each is beneficial for one or several of the most frequently used operations. While this approach leads to an increased memory, that price may be acceptable to pay for systems focusing upon analysis/aggregation execution speed, rather than exclusively upon reduction of memory consumption. This is something a user needs to define beforehand to allow the system to take these decisions accordingly. This user configuration may be reflected in the cost model as the weighting factor.

The use of compression allows access to multiple representations at the same time, without increasing the memory consumption to be larger than the original data. To limit consumption of additional memory, certain embodiments may allow vertical distribution of multiple representations for only identified hot zones of the data.

Figure 6:
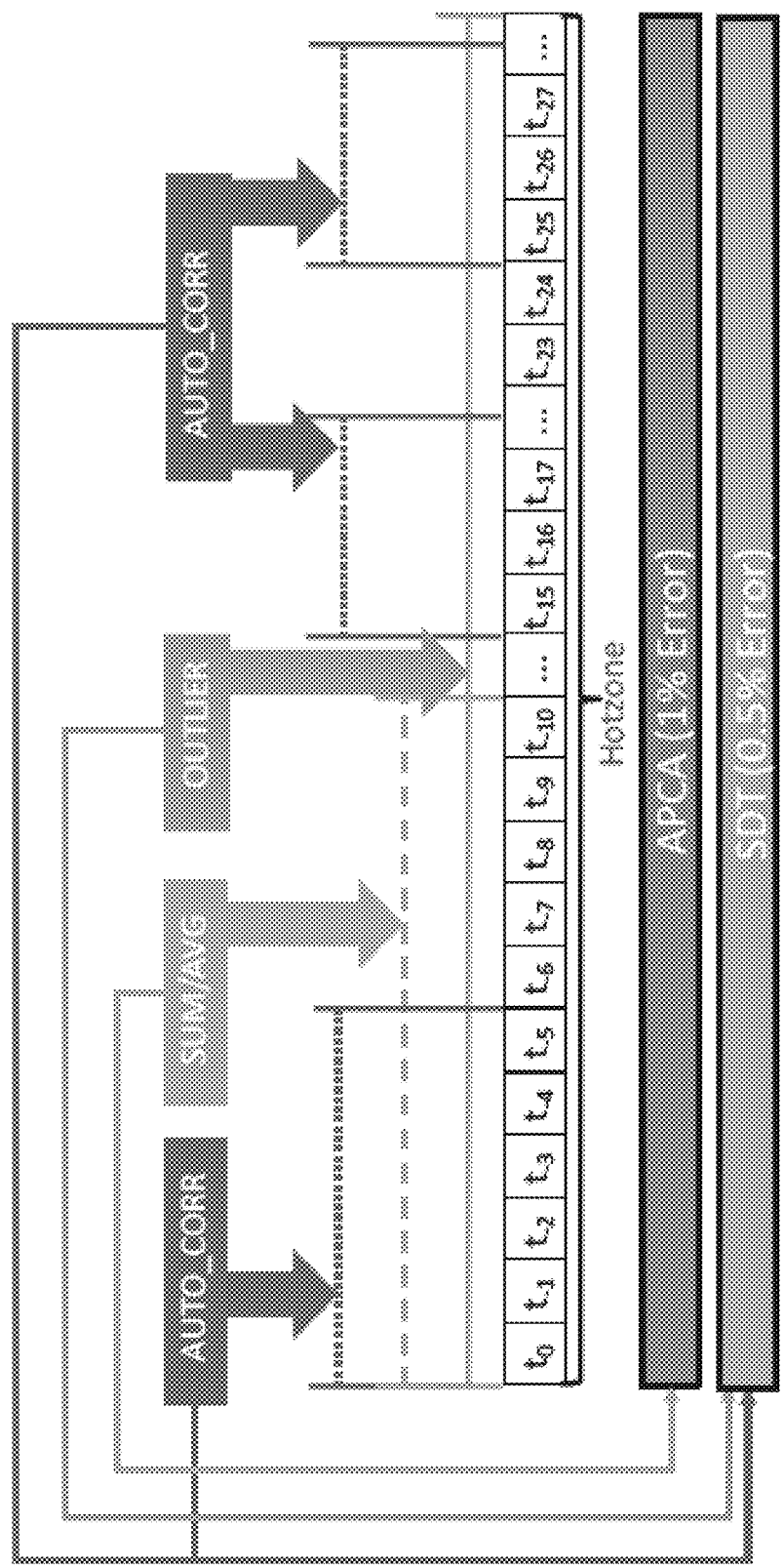
FIG. 6 illustrates implementing an execution pattern optimization process utilizing vertical multi-representational storage of time series data according to an embodiment.

In an example shown in FIG. 6, assume that that SDT is best suited for outlier detection and for calculating the auto correlation. APCA provides the best execution speed for AVG and SUM aggregations.

A potential hot zone is determined for all operations. For this hot zone, embodiments use both representations (SDT, APCA) in parallel. Each operation targets the representation providing the highest execution speed for it.

Thus the SUM/AVG operation reads the data from the representation using APCA. The auto correlation operation as well as the outlier detection operation works on the SDT representation.

FIG. 6 thus shows the outlier detection considering the entire Hot Zone, while the aggregation function is most frequently only calculated on the first ten values.

Furthermore, the auto correlation (AUTO_CORR) has a repeating pattern reading five values every five values. The access patterns are assigned accordingly, and the APCA and SDT representation are created to co-exist in the hot zone.

Figure 7:
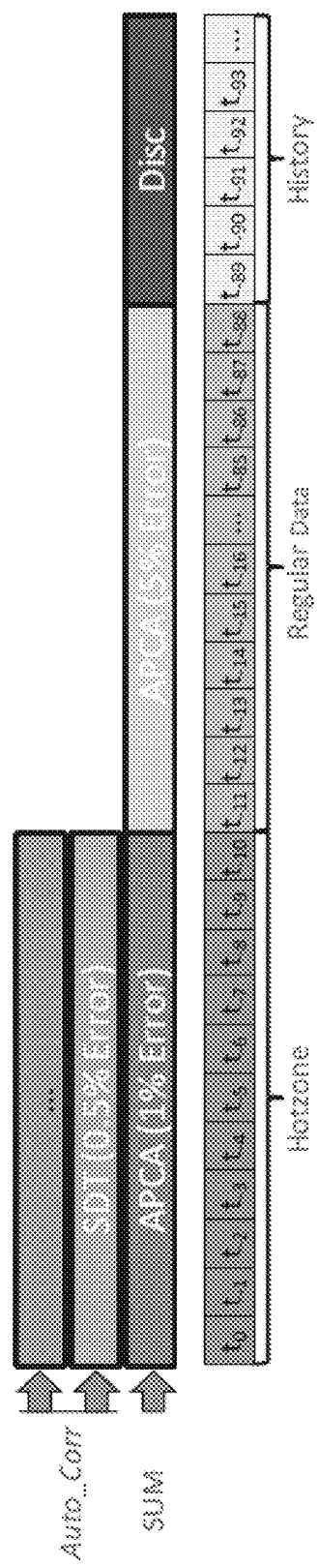
FIG. 7 illustrates a process combining data aging and execution pattern optimization utilizing horizontal and vertical multi-representational time series storage according to an embodiment.

It is also possible to combine data aging and execution pattern optimization. This is illustrated in the example of FIG. 7, which employs horizontal multi-representation to achieve aging of History data to Disc execution pattern optimization (SUM, Auto_Corr) is accomplished using vertical multi-representation within the Hot zone.

The concrete configuration with respect to which models are used in which time frames, and which values are considered by the respective models, may be determined by the multi-representation advisor. FIG. 8 is a simplified diagram illustrating the working process of the advisor, including the identification of inputs and outputs.

The multi-representation advisor determines the most optimal configuration and distribution of the different representations used for the entire time series and time series columns. Overall, the advisor makes decisions regarding one or more of the following:
compression technique used;
range(s) applied to a representation;
error bounds (in the borders of the user configuration);
multiple and overlapping representations;
storage medium.

For each added time series, this determination process can be done once offline using statistics and recorded workloads. Afterwards, the advisor may calculate adaptations based upon workload changes and changes in the time series characteristics that come in during the usage. This may especially involve adaptation of the hot zones as well as the adaptation of the vertical and/or horizontal representation distribution(s).

A time series might have multiple columns, i.e., multiple parallel measurements. The advisor is capable of providing a strategy for the entire time series, but it does so by considering each column separately. Accordingly, each column receives its own specific configuration.

The advisor makes decisions by considering different metrics and characteristics of a workload and the supported representations. In particular, FIG. 8 shows an offline advisor mode creating the initial configuration when a time series is added. According to certain embodiments, however, the advisor is also capable of adapting the configuration with respect to ongoing changes in the querying behavior or time series characteristics in a current workload. This is done in an online mode.

In the online mode, current querying behavior and incoming new values are analyzed to identify recommended adaptations. Such monitoring may especially involve detecting one or more of the following:
hot zone movements;
new/outdated hot zones;
changes in the size of hot zones;
operation frequencies;
changes in the time series characteristic, influencing certain compression techniques;

applicability of the chosen aging strategy and potential border moves;
runtime benefits of operations due to having vertical representations.

If significant changes occur in the monitored area, the advisor may recalculate the cost model, utilizing it to identify potential changes to the current configuration. Once free resources are available, the advisor takes care of applying those changes automatically.

The advisor may acknowledge a specific configuration before making automatic decisions and providing statistics. Such configurations may be provided by another system component such as an application, database, or distribution engine, or may be provided by a human user. In particular, the user may manually define hot zones of the time series, as well as define a maximum per value error or an overall error bound. The entire aging strategy may be defined.

In certain embodiments, a user may manually configure one or more of but not limited to the following:
ranges regarded as hot zones
maximum number of hot zones
the amount of uncompressed values in a hot zone
the aging strategy
activating/deactivating horizontal partitioning besides the hot zones
activating/deactivating vertical partitioning within the hot zones
maximum amount of additional memory for speedup representations
maximum per value error bound (required to be defined by the user)
maximum per value error bound a hot zone
maximum overall error in a given range
most frequent query types (e.g., SELECT, SUM, AUTO_CORR)
a weight deciding between memory consumption and performance
a weight deciding between memory consumption and accuracy The advisor may automatically compute decisions not made by the user. In addition, the advisor may also create suggestions that the user may adapt manually. Certain embodiments may require the user to define an upper limit for the allowed error caused by compressing the values.

One or more of the following properties for a time series may be considered by the advisor:
time series characteristics (online), for example:
min, max,
number of distinct values,
frequency skew,
mean, standard deviation, variance,
shape,
equidistance;
query workload (offline+online), for example:
query type,
frequently involved columns,
most common aggregation/analysis functions,
frequently covered ranges (hot zones),
rate of inserts and updates,
groupings, partitioning,
general average number of queries,
average number of parallel queries;
representation characteristics (offline+online), for example:
applicability of a representation towards an analysis/aggregation function,
estimated speed improvement per analysis/aggregation function,
general error characteristics,
expected memory consumption,
capability of being queried in a hierarchical way, hence having a hierarchical error level. (This is valid in e.g. wavelet representation.)

The advisor takes one or more of these properties into account in determining a representation configuration or when monitoring its viability. The determination process can be divided into multiple phases:
(1) the identification of the hot zones,
(2) the data aging configuration; and
(3) the evaluation of different representation configurations for the hot zones based on a cost model that involves the compression rate, speed up and frequency of analytic operations.

The following describes three phases of an automatic decision process of the advisor in detail. Discussed first is hot zone identification, then a specific data aging strategy, and then hot zone configuration.

A hot zone is the range in the time series that is frequently targeted by queries and operations. In certain cases, this involves the most recent values of the time series, since they may be of special interest for analysis algorithms and aggregations.

The hot zones may be determined from a recorded workload (i.e., offline), from statistics of other time series, or from a default configuration (e.g., regarding the most recent 10% of the values as the hot zone.)

The order may reflect the priority of the input. When using a recorded workload, the contained queries are analyzed and the most frequent ranges identified by determining the quartiles on the number of range occurrences.

Certain embodiments may use a similarity factor of 90% to allow a fuzzy matching of similar ranges. The reason is that for evolving series, the considered ranges may move slightly. A similarity factor of 90% refers to a 90% overlap of ranges. For fuzzy matches the outermost starting points and end points are considered.

Ranges with a number of occurrences above the median (3rd, 4th quartile, . . . ) may be considered to be the most frequent ranges. If multiple ranges are identified in the process, the advisor tries to consolidate them to avoid creating scattered hot zones.

Thus, the advisor may unify multiple identified ranges as long as they do not result in a hot zone that is larger than 20% (or some other value configurable by the user) of the entire time series. The unification may be performed by picking the most outer starting and end points of the involved ranges.

For the final selection of hot zones, the advisor may consider the user configuration of the maximum number of hot zones and selects the respective number from the top. Hot zones may be adapted or re-identified during the online phase of the advisor, as is discussed further below.

One specific data aging strategy adopted according to particular embodiments, is now described. In defining the strategy, it is recommended that the user should determine after which number of values a new data aging segment is started, and how much the error is allowed to increase. However, the user may request a suggestion or a fully automated configuration from the advisor. In a specific embodiment the following measures may be taken to determine a data aging strategy.

The standard strategy is for the advisor to first divide the data into two halves. The more recent half is targeted to remain in main memory, while the second half is intended to be written to disk if the available main memory is not sufficient. Alternatively, a representation offering a very high compression may be used.

By analyzing the workload, the advisor corrects this border with respect to potential queries targeting values in the direct surrounding of the border. In addition, hot zones within the second half may also be identified. Hot zones found in this part are excluded from storage on disk and remain exclusively in memory. The more recent first half is divided into several parts, where each of these so called data aging segments contains as many values as 10% of the total number of time series values. The share of values per data aging segment may be changed by the consumer (as mentioned above). Similarly, the possible error range of 0.1% to the maximum error allowed by the user is split and assigned in accordance to the number of resulting data aging segments. In addition, the frequently requested regions—the hot zones—are identified and considered as additional segments receiving the minimal error determined by the split described above.

Now for each of the data aging segments (independently of whether they were defined by the user or the system), we are calculating a compression score identifying the compression and error bound (i.e., the representation) that provides the highest compression per error ratio for the respective range. The resulting representation is then assigned to the respective time series range. The compression score of a representation r∈R is calculated as:

$$comp_{score}(r): R \to \mathbb{R} = \left(\bar{\epsilon}(r) + \frac{space(r)}{space(raw)}\right)^{-1}$$

where R is the set of available representations, and ∀r∈R: $0 \le \bar{\epsilon}(r) \le 1$ The score is calculated by using a sample of the range to determine the overall average error that is not measured per value, but over the sample. Different compression techniques might provide different average errors even though they use the same per value error bound. Also, compression techniques without a per value error are allowed to compete.

Consider, for example, an APCA compression with an average overall error of 2% and a memory reduction from 4.5 GB to 225 MB. The resulting score for the APCA compression would be 14.29. In contrast, using an SDT compression that provides an average overall error of 0.8%, but only reduced the memory to 500 MB, results in a score of 10.32. As a result, in this example the APCA compression would be chosen.

The example above basically assumes balance between memory consumption and accuracy. However, the user is allowed to adjust a preference between accuracy and space by setting a weight ω, 0<ω≤1. In this case the model changes to:

$$comp_{score}(r): R \to \mathbb{R} = \left(\omega \cdot \bar{\epsilon}(r) + (1-\omega)\frac{space(r)}{space(raw)}\right)^{-1}$$

Thus, the higher the weight the more emphasis is put towards the accuracy of the representation. Accordingly, when weighting the resulting error with a weight of 0.8 and the space with 0.2, the resulting scores change for APCA to 38.46 and for SDT to 41.36. Thus, in this case SDT is chosen, despite the fact that it consumes more memory.

It is the other way round when weighting the required space with 0.8 and the resulting error with 0.2,—the picture changes. APCA now receives a score of 22.72 and SDT a score of 13.75. Thus in this case, APCA would have been chosen.

Determination of the hot zone configuration according to certain particular embodiments, is now discussed. The configuration of the hot zones is a separate task and involves the creation of multiple vertical representations that coexist at the same time. It is desired to speed up specific query types or groups of query types. However, additional representations also result in additional memory consumption. Thus, it is sought to achieve a balance between performance gain and space.

Accordingly, one model calculating a score for a configuration of a hot zone incorporates two parts given by:

$$score(r): R^N \to \mathbb{R} = comp_{score}(r) \cdot op_{score}(r)$$

Comp$_{score}$(r) is based on the compression score already calculated for determining the most beneficial representations in the data aging case. For calculating the compression score in a hot zone, we have to first adjust the compression score to acknowledge multiple representations at the same time. The rule for calculating the compression score changes to:

$$comp_{score}(r): R^N \to \mathbb{R} = \left(\omega \cdot \bar{\epsilon}(r) + (1-\omega)\frac{space(r)}{space(raw)}\right)^{-1}$$

$$space(r): R^N \to \mathbb{R} = \sum_{r_i \in r} space(r_i)$$

$$\bar{\epsilon}(r): R^N \to \mathbb{R} = \max_{r_i \in r} \bar{\epsilon}(r_i)$$

where R is again the set of available representations.

Thus, the overall average error is equal to the minimal average error reached by all representations and accordingly, the space is the sum of the memory requirement from all representations. We now account for potential speed improvements of operations, focusing on operations that are more frequently issued and that cover the current hot zone as best as possible. This is done by calculating the operation score op$_{score}$. It comprises two parts where one is acknowledging the usage frequency and hot zone coverage and the other part is considering the potential speed improvement over raw.

Thus, we arrive at:

$$op_{score}(r) = \sum_{o \in O}\left(usage(o) * \frac{\bar{t}(o, r_{raw})}{\min_{r_i \in r}(\bar{t}(o, r_i))}\right)$$

where O is the set of possible operation relevant for hot zone optimization.

The usage part of the equation is defined as:

$$usage(o) = \frac{num_o}{\sum_{o_i \in O} num_{o_i}} * \begin{cases} 1, & hotzoneOverlap(o) \le 0 \\ hotzoneOverlap(o), & hotzoneOverlap(o) > 0 \end{cases}$$

$$hotzoneOverlap(o) = \max(hotzone_{start} - opRange_{start}, 0) + \max(opRange_{end} - hotzone_{end}, 0)$$

The significance of an operation is calculated by first determining its occurrence frequency, and second by assessing the overlap of the operation target zone with the hot zone. There, we sum the number of values before or behind the hot zone targeted by the query, and thus determine the relevance of the hot zone with respect to the operation. Operations that do not intersect with the hot zone at all, are not considered in this calculation. It is possible for the user to adjust the balance between execution speed and memory consumption by applying a weight σ, 0<σ≤1 to the score equation, which leads to:

$$\text{score}(r):R^N \to \mathbb{R} = (\text{comp}_{score}(r))^{\sigma} \cdot (\text{op}_{score}(r))^{1-\sigma}$$

The representation configuration that receives the highest score for the hot zone at hand is chosen and the respective representations are created. Operations targeting the respective hot zone are executed on the most beneficial representation, where the pure average runtime is the relevant decision criterion. Thus, the usage of the different representations distributed horizontally and vertically is transparent to the user.

The above description has focused upon the generation and storage of multiple representations of time-series data. Accessing that stored multi-representation time series data for various purposes (e.g., inspection, analysis) is now discussed.

In particular, requesting time series values from the system, involves abstracting from the horizontal and vertical representation configuration. Instead of requiring the user or application to request each area separately, embodiments may employ a transparent intelligent iterator in order to deliver the values in the requested range.

Accordingly, FIG. 1 shows such an intelligent iterator 160. Based upon an algorithm execution 162, the intelligent iteration concept offers the capacity to abstract from multiple representations. This renders the representations transparent while iterating over the time series.

Figure 9:
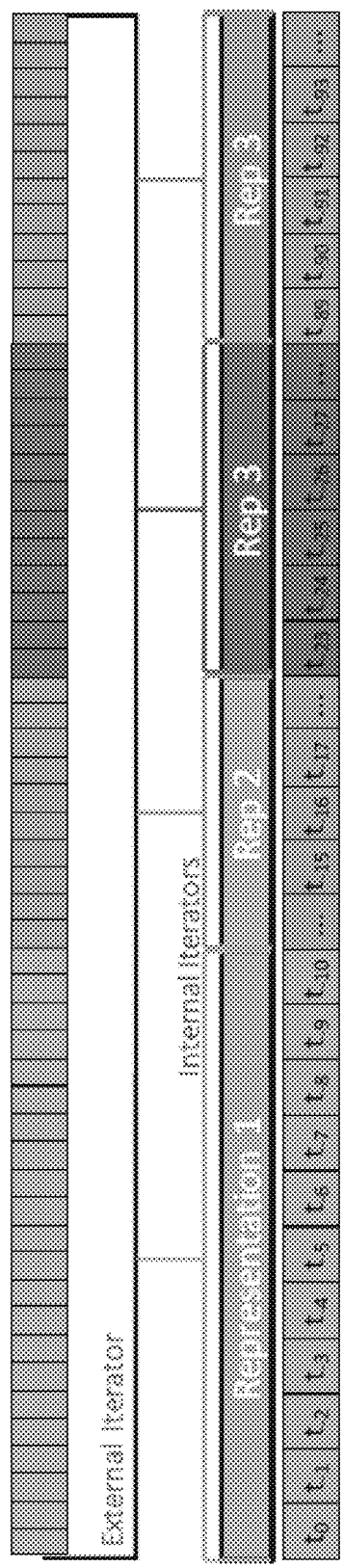
FIG. 9 illustrates a simplified view of a transparency iterator concept.

The system thus internally takes care of moving the internal iteration structure between the different representations, and also handles translations or costs. The transparency iterator concept further illustrated in FIG. 9.

An additional potential benefit offered by an intelligent iterator is support for automatic granularization. Specifically, the iterator returns the values in a requested granularity (e.g. one value per day) even though the representation itself is in a different granularity (e.g., one value per hour). This may be done without influencing the underlying data structure.

For periods of the time series using model-based compressed representation, the granularization functionality is thus obtained for free by exploiting the continuity of the underlying functions (i.e., the capability to evaluate a function at arbitrary points and in arbitrary granularity). As a result, the iterator simply returns the evaluation results given by the requested resolution.

For periods of the time series using uncompressed representations, the iterator may automatically utilize rounding (aggregation) and distribution (disaggregation) methods. The user is capable of defining which rounding or distribution algorithm is to be used.

If no decision is taken, embodiments may utilize the average for rounding and even distribution for the disaggregation. This may be implemented transparent to the underlying data structure.

Apart from offering the potential advantage of providing an easy way to answer queries requesting a different granularity, the transparent iterator can also be utilized as input to many time series analysis algorithms, allowing an execution of the analysis in an arbitrary resolution.

Multi-representation time series data storage according to embodiments may offer one or more benefits. In particular, horizontal and vertical distribution of time series representations may serve to improve memory consumption, query execution speed, and accuracy.

Also, consideration of specific compression techniques, error bounds, and storage media may permit tailoring of memory consumption, execution speed, and accuracy to desired levels.

Embodiments further allow configuration of multiple representations at the same time, based on query workload analysis. Hot zones and data aging strategies may be identified based on query range analysis.

The representation advisor automatically determines a favorable configuration of multiple data representations. The representation configuration can automatically be adapted based upon changes in the workload. The advisor can automatically analyze offline and online workload, data characteristics, and representation characteristics in order to arrive at a final conclusion.

Embodiments may reference a cost model for determining a representation for data aging and other applications. An enhanced cost model may be used for determining representation configuration for hot zones.

Figure 10:
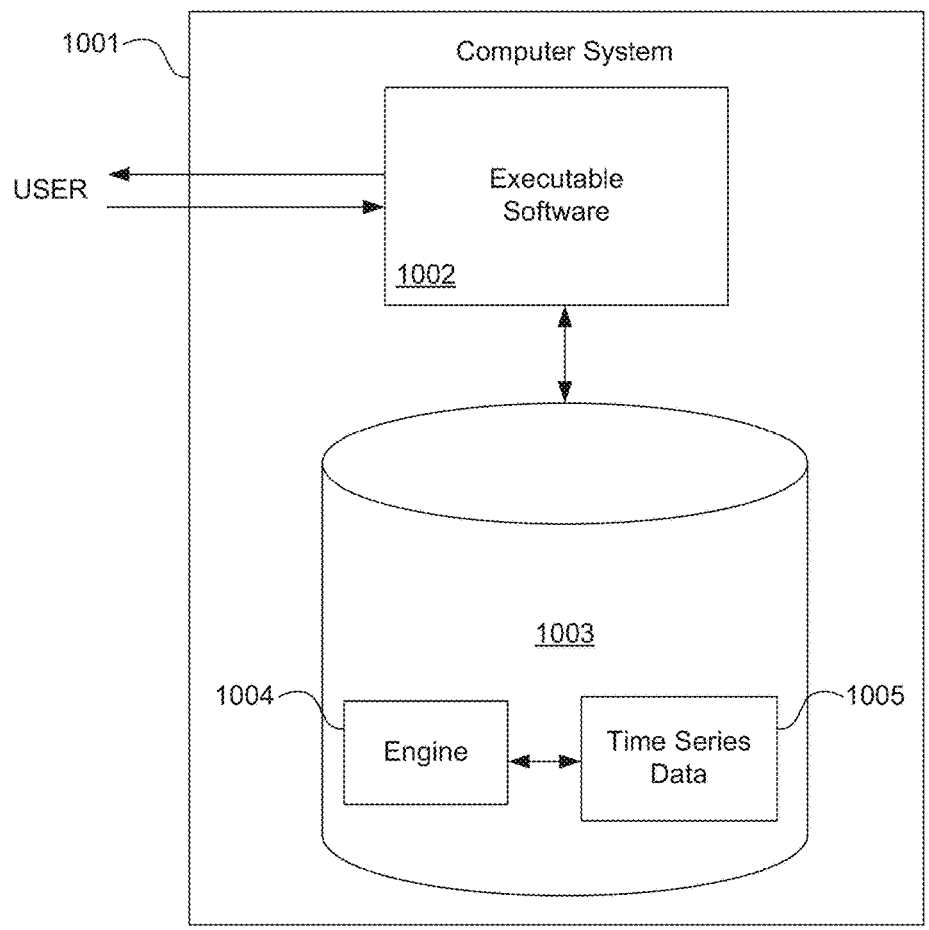
FIG. 10 illustrates hardware of a special purpose computing machine configured to implement multi-representation storage of time series data according to an embodiment.

In certain embodiments, the engine and/or representation advisor may be implemented by a database engine, such as an in-memory database engine. For example, FIG. 10 illustrates hardware of a special purpose computing machine configured to provide multi-representation time series data storage according to an embodiment. In particular, computer system 1001 comprises a processor 1002 that is in electronic communication with a non-transitory computer-readable storage medium 1003. This computer-readable storage medium has stored thereon code 1005 corresponding to time series data. Code 1004 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 10, the engine is shown as being part of a database. Such an embodiment can correspond to analytical applications that perform processing utilizing a powerful engine available as part of an in-memory database (e.g., the HANA Vora distributed in-memory database available from SAP SE of Walldorf, Germany). This is not required, however, and in certain embodiments the engine may be implemented in other ways, for example as part of an application layer overlying a storage medium.

Figure 11:
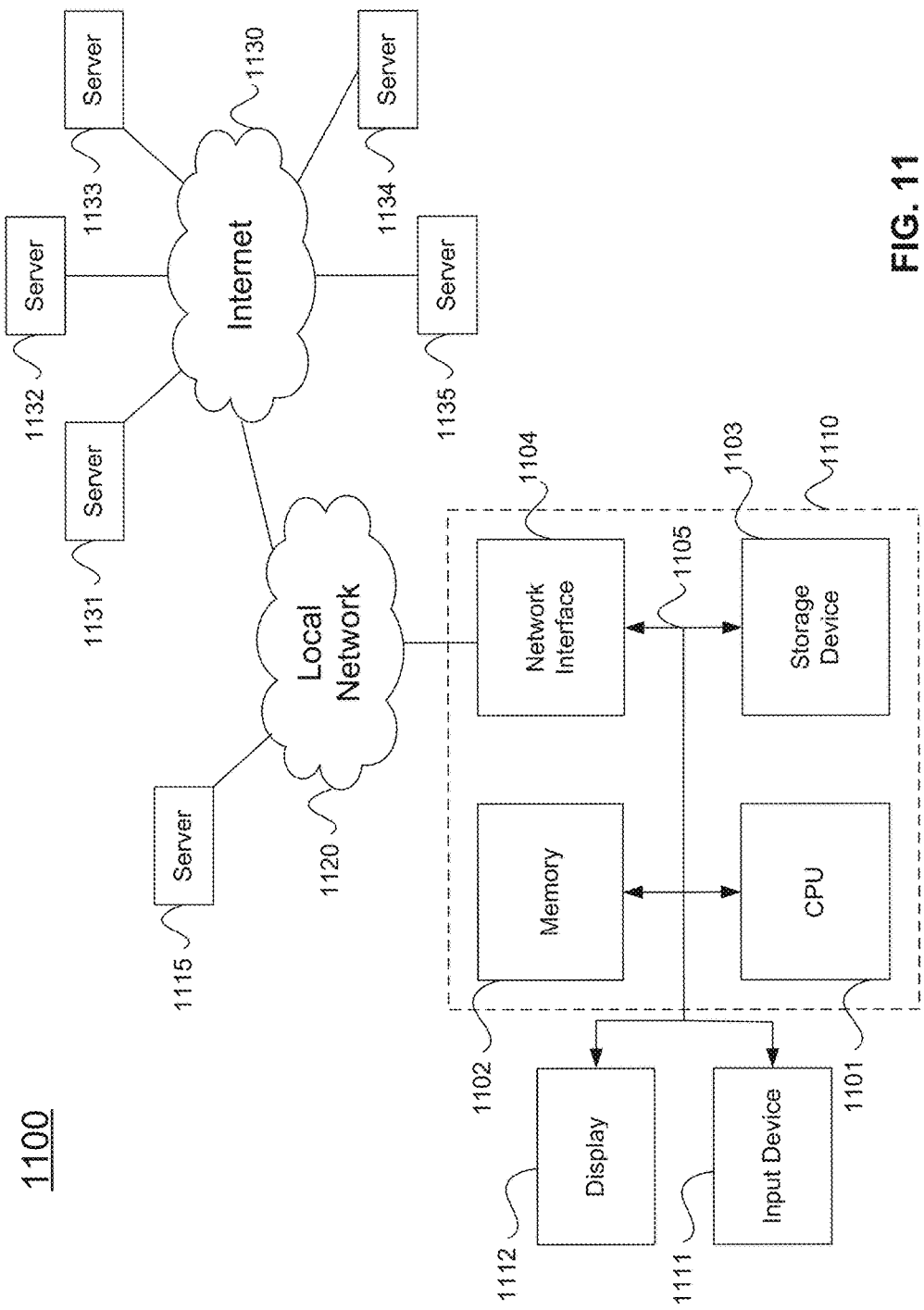
FIG. 11 illustrates an example computer system.

An example computer system 1100 is illustrated in FIG. 11. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including information and instructions for performing the techniques described above, for example. This memory may also be used for storing variables or other intermediate information during execution of instructions to be executed by processor 1101. Possible implementations of this memory may be, but are not limited to, random access memory (RAM), read only memory (ROM), or both. A storage device 1103 is also provided for storing information and instructions. Common forms of storage devices include, for example, a hard drive, a magnetic disk, an optical disk, a CD-ROM, a DVD, a flash memory, a USB memory card, or any other medium from which a computer can read.

One specific type of non-transitory computer readable storage medium is Non-Volatile Random Access Memory (NVRAM). That storage technology can play a significant role for database systems, because NVRAM can hold an in-memory database in memory, thereby obtaining persistence for free.

Storage device 1103 may include source code, binary code, or software files for performing the techniques above, for example. Storage device and memory are both examples of computer readable media.

Computer system 1110 may be coupled via bus 1105 to a display 1112, such as a cathode ray tube (CRT) or liquid crystal display (LCD), for displaying information to a computer user. An input device 1111 such as a keyboard and/or mouse is coupled to bus 1105 for communicating information and command selections from the user to processor 1101. The combination of these components allows the user to communicate with the system. In some systems, bus 1105 may be divided into multiple specialized buses.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1104 sends and receives electrical, electromagnetic, or optical signals that carry digital data streams representing various types of information.

Computer system 1110 can send and receive information, including messages or other interface actions, through the network interface 1104 across a local network 1120, an Intranet, or the Internet 1130. For a local network, computer system 1110 may communicate with a plurality of other computer machines, such as server 1115. Accordingly, computer system 1110 and server computer systems represented by server 1115 may form a cloud computing network, which may be programmed with processes described herein. In the Internet example, software components or services may reside on multiple different computer systems 1110 or servers 1131-1135 across the network. The processes described above may be implemented on one or more servers, for example. A server 1131 may transmit actions or messages from one component, through Internet 1130, local network 1120, and network interface 604 to a component on computer system 1110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    an engine receiving time series data;
    the engine referencing a first input to create from the time series data, a first representation comprising a covered time period, a compression model, an error bound, and a storage medium, wherein the configuration designates the first representation as lying within a hot zone;
    the engine storing the first representation within the storage medium;
    the engine referencing a second input to create from the time series data, a second representation differing from the first representation in at least one of the covered time period, the compression model, the error bound, and the storage medium; and
    the engine storing the second representation, wherein:
    the second input comprises a vertical configuration determined according to a cost model of an advisor component; and
    a second time period of the second representation overlaps the covered time period of the first representation.

2. A method as in claim 1 wherein the second input is based upon a data aging process.

3. A method as in claim 1 wherein the second input is based upon an operation execution pattern optimization process.

4. A method as in claim 1 wherein:
    the storage medium comprises a Random Access Memory (RAM) of an in-memory database; and
    the engine comprises an in-memory database engine.

5. A method as in claim 1 wherein data of the first representation or of the second representation are stored with a granularity determined by the compression model, the method further comprising:
    the engine receiving a request to return the data of the first representation or of the second representation according to a different granularity; and
    an iterator executing an algorithm to return the data of the different granularity to the engine.

6. A method as in claim 5 wherein the iterator executes the algorithm to perform aggregation or disaggregation.

7. A method as in claim 1 wherein the cost model involves a characteristic of an analytical operation.

8. A non-transitory computer readable storage medium embodying a computer program for performing a method, said method comprising:
    an engine receiving time series data;
    the engine referencing a first input to create from the time series data, a first representation comprising a covered time period, a compression model, an error bound, and the non-transitory computer-readable storage medium, wherein the configuration designates the first representation as lying within a hot zone;
    the engine storing the first representation in the non-transitory computer readable storage medium;
    the engine referencing a second input to create from the time series data, a second representation differing from the first representation in at least one of the compression model, the error bound, and the non-transitory computer readable storage medium, a second covered time period of the second representation overlapping the covered time period of the first representation; and the engine storing the second representation, wherein:
the second input comprises a vertical configuration determined according to a cost model of an advisor component.

9. A non-transitory computer readable storage medium as in claim 8 wherein the method further comprises the engine:
referencing the vertical configuration to create from the time series data, a third representation; and
storing the third representation, wherein,
a third time period of the third representation overlaps the covered time period of the first representation or the second covered time period of the second representation, and
the third representation differs from the first representation in at least one of the compression model and the error bound.

10. A non-transitory computer readable storage medium as in claim 9 wherein the method comprises a data aging process.

11. A non-transitory computer readable storage medium as in claim 8 wherein the vertical configuration is based upon an operation execution pattern optimization process.

12. A non-transitory computer readable storage medium as in claim 8 wherein:
the non-transitory computer readable storage medium comprises a Random Access Memory (RAM) of an in-memory database; and
the engine comprises an in-memory database engine.

13. A non-transitory computer readable storage medium as in claim 8 wherein data of the first representation or of the second representation are stored with a granularity determined by the compression model, and the method further comprises:
the engine receiving a request to return the data of the first representation or of the second representation according to a different granularity; and
an iterator executing an algorithm to return the data of the different granularity to the engine.

14. A non-transitory computer readable storage medium as in claim 8 wherein the cost model involves a characteristic of an analytical operation.

15. A computer system comprising:
an in-memory database engine;
a software program, executable on said computer system, the software program configured to cause the in-memory database engine to:
receive time series data;
reference a first input to create from the time series data, a first representation comprising a covered time period, a compression model, an error bound, and a storage medium, wherein the configuration designates the first representation as lying within a hot zone;
store the first representation in the storage medium;
reference a second input to create from the time series data, a second representation differing from the first representation in at least one of the covered time period, the compression model, the error bound, and the storage medium; and
store the second representation, wherein:
the second input comprises a vertical configuration determined according to a cost model of an advisor component; and
a second time period of the second representation overlaps the covered time period of the first representation.

16. A computer system as in claim 15 wherein:
the storage medium comprises a Random Access Memory (RAM) of an in-memory database;
the second input comprises a horizontal configuration based upon a data aging process; and
the second representation is stored outside the RAM as part of the data aging process.

17. A computer system as in claim 15 wherein the software program is further configured to cause the in-memory database engine to reference the vertical configuration to create from the time series data, a third representation,
wherein a third covered time period of the third representation overlaps the time period of the first representation or the second time period of the second representation, and
wherein the third representation differs from the first representation in at least one of the compression model and the error bound.

18. A computer system as in claim 15 wherein the second representation is based upon an operation execution pattern optimization process.

19. A computer system as in claim 15 wherein data of the first representation or of the second representation are stored with a granularity determined by the compression model, and the software program is further configured to cause the in-memory database engine to:
receive a request to return the data of the first representation or of the second representation according to a different granularity; and
cause an iterator to execute an algorithm to return the data of the different granularity to the engine.

20. A computer system as in claim 15 wherein the cost model involves a characteristic of an analytical operation.

* * * * *